(No Model.)
F. E. HORNE.
HACK SAW FRAME.
No. 499,227.  Patented June 13, 1893.
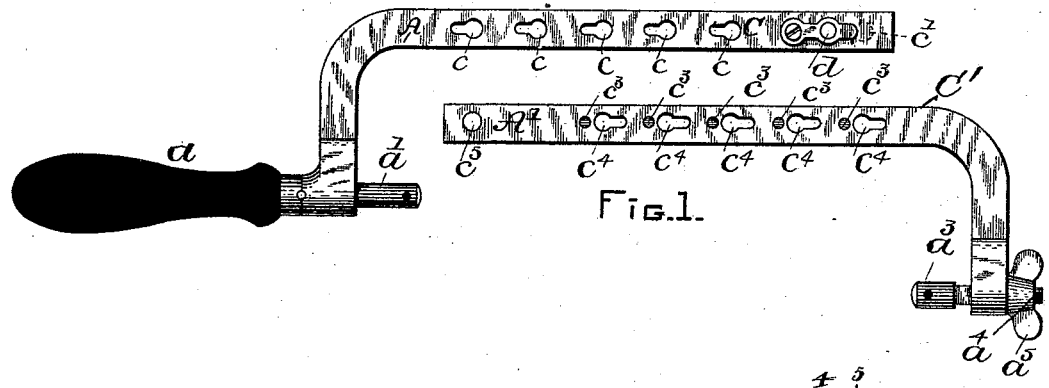
Fig. 1.
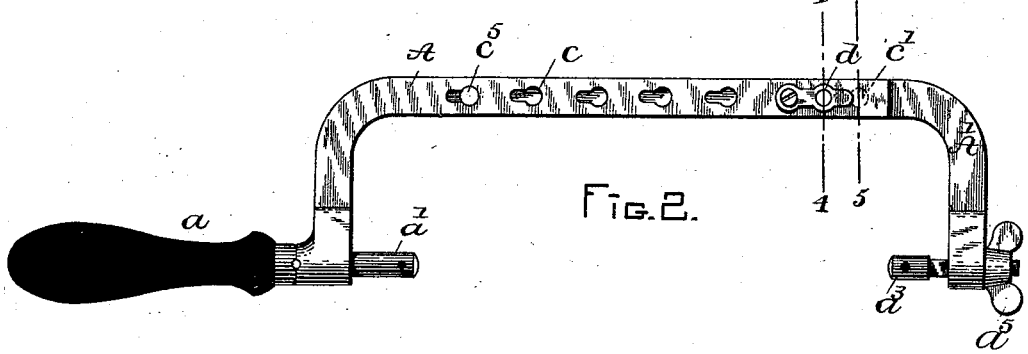
Fig. 2.
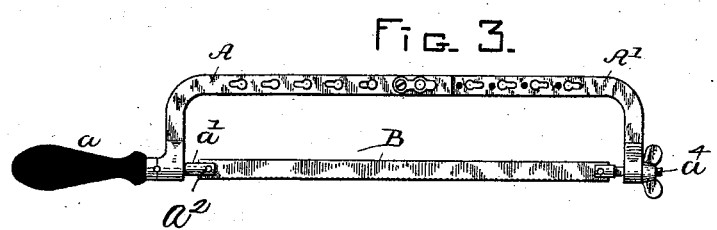
Fig. 3.
Fig. 4.  Fig. 5.
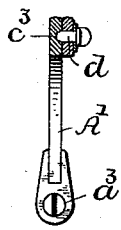 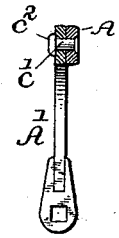
WITNESSES.
J. M. Dolan.
M. Lynch
INVENTOR.
Fred E. Horne
by his Attys
Clarke & Raymond

UNITED STATES PATENT OFFICE.

FRED E. HORNE, OF MALDEN, MASSACHUSETTS.

HACK-SAW FRAME.

SPECIFICATION forming part of Letters Patent No. 499,227, dated June 13, 1893.

Application filed January 24, 1893. Serial No. 459,513. (No model.)

*To all whom it may concern:*

Be it known that I, FRED E. HORNE, a citizen of the United States, residing at Malden, in the county of Middlesex, in the State of Massachusetts, have invented a new and useful Improvement in Hack-Saw Frames, of which the following is a full, clear, and exact description, reference being had to the accompanying drawings, forming a part of this specification, in explaining its nature.

It is desirable to provide means in a hack saw frame whereby saws of varying lengths may be carried by the same saw frame; and my invention relates to a means for obtaining this result, the saw frame being made in two parts with sections or bars which are arranged to overlap, and which are adjustably secured together by locking slots of a key-shaped form, preferably reversely arranged in each overlapping section and locking pins, one on each bar to engage a slot in the opposite bar, the locking pins seating against the ends of the slots when pressed home. The application of the saw to its holders and the tightening thereof strains the two frame sections against the locking pins and rigidly holds them together.

The invention will be more fully described in connection with the accompanying drawings, wherein—

Figure 1 is a view representing the two parts of the saw frame separated from each other. Fig. 2 represents them assembled. Fig. 3 is a view with the saw blade secured to the frame. Fig. 4 is a section upon the dotted lines 4—4 of Fig. 2. Fig. 5 is a section upon the dotted line 5—5 of Fig. 2.

Referring to the drawings: A represents one part of the saw frame, and A' the other part thereof. The part A carries the handle $a$ which has the usual spindle $a'$, ending in a slot which receives one end of the saw B, the saw being held to the spindle by a cross-pin $a^2$ extending through a hole in the spindle and in the end of the saw. The part A' has the usual slotted saw holding spindle $a^3$, to the inner end of which the end of the saw is secured by a pin. This spindle has a threaded end $a^4$ upon which screws the saw tightening nut $a^5$. The part A has the section or bar C, which is preferably somewhat thin and flat which has the key-shaped slots $c$ formed therein, the slots being arranged in line with each other, and having their contracted sections in the direction of the handle. The section C also has at its outer end a locking pin $c'$, which is in the form of a stud having a shank of a size to enter the contracted portion of one of the key-shaped slots of the section C' of the other part A', and a head $c^2$ of a size slightly smaller than the enlarged section of said slot, but wider than the contracted section. The section C also has a spring latching pin $d$, which is adapted to engage a registering hole $c^3$ in the section $c'$. Section C' of the part A' is also rectangular and flat, corresponding to the shape of the section C. It has the key-slots $c^4$ arranged in line therein, but in a direction the reverse of that of the key slots of the section C. It also has the registering holes $c^3$ between the slots for the reception of the end of the registering pin $d$, and at its outer end the locking pin $c^5$, which interlocks with one of the key slots of the section C. This locking pin is the counterpart of the locking pin $c'$, above described. To secure the two parts together the sections are placed side by side, and the locking pin of each caused to enter the enlarged section of one of the key hole slots in the other section, and by pushing the two parts toward each other the pins are caused to enter the contracted sections of the slots and seat themselves against the ends of the slots, while the latching pin at the same instant finds its registering hole. The saw is then attached to its holding spindles and strained by the tension screw. There are as many opportunities for varying the size of the frame afforded as there are key hole slots.

While there is some advantage in using a registering pin it is not necessary, and I do not consider that it is an essential element of the invention, and a bow or other spring secured to one section to bear against the other will answer substantially as well.

I would say that the key-hole slots instead of having their contracted sections arranged as represented in the drawings, may have such sections extended in the opposite direction, or so that the enlargements be nearest the outer ends of the frame, but when so arranged it is desirable to use the latching pin above specified.

Having thus fully described my invention, I claim and desire to secure by Letters Patent of the United States—

1. As an improved article of manufacture, the hack saw frame herein described having two parts A A', each part having a section provided with key-hole slots, and a locking-pin, the key-hole slots of one section being reversely arranged to those of the other, and the locking pin of one section engaging the other section through the contracted portion of the key-shaped slot therein, as and for the purposes described.

2. The combination in a hack saw frame of the part A, having the key-shaped slot $c$, the locking pin $c'$, and the spring registering pin $d$ with the part A' having the key-slots $c^4$, the locking pin $c^5$, and the registering holes $c^3$, as and for the purposes described.

FRED E. HORNE.

Witnesses:
F. F. RAYMOND, 2d,
J. M. DOLAN.